(12) United States Patent
Chen et al.

(10) Patent No.: US 11,894,896 B2
(45) Date of Patent: Feb. 6, 2024

(54) CODEBOOK PROCESSING METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Wenhong Chen, Guangdong (CN); Yun Fang, Guangdong (CN); Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/147,697

(22) Filed: Dec. 28, 2022

(65) Prior Publication Data

US 2023/0170954 A1    Jun. 1, 2023

Related U.S. Application Data

(63) Continuation of application No. 17/361,777, filed on Jun. 29, 2021, now Pat. No. 11,575,418, which is a (Continued)

(51) Int. Cl.
*H04L 1/02* (2006.01)
*H04B 7/0456* (2017.01)
*H04L 5/00* (2006.01)

(52) U.S. Cl.
CPC ......... *H04B 7/0486* (2013.01); *H04L 5/0057* (2013.01)

(58) Field of Classification Search
CPC ............. H04L 63/1475; H04L 2209/60; H04L 27/2636; H04L 5/0057; H04B 7/0617;
(Continued)

(56) References Cited

U.S. PATENT DOCUMENTS

2005/0123138 A1   6/2005   Abe et al.
2018/0145737 A1   5/2018   Rahman et al.
(Continued)

FOREIGN PATENT DOCUMENTS

CN    103701571 A     4/2014
WO    2018127151 A1   7/2018
(Continued)

OTHER PUBLICATIONS

International Search Report in the international application No. PCT/CN2019/070708, dated Sep. 27, 2019.
(Continued)

*Primary Examiner* — Khai Tran
(74) *Attorney, Agent, or Firm* — PERKINS COIE LLP

(57) ABSTRACT

Disclosed are a codebook processing method, a terminal device, and a network device, the method comprising: determining weighting coefficients for codebook calculation based on a first number and a second number, wherein a value of L representing the first number is half of a number of spatial beams, a value of M representing the second number is a number of discrete fourier transform (DFT) basis vectors. L and M are both integers, and the weighting coefficients comprise amplitude coefficients; performing processing on the weighting coefficients; and transmitting the processed weighting coefficients to a network device through channel state information (CSI).

9 Claims, 7 Drawing Sheets

---

21 — Non-quantized weighting coefficients for codebook calculation are at least determined based on a first number and a second number 22 — Quantization processing is performed on the non-quantized weighting coefficients to obtain quantized weighting coefficients 23 — The quantized weighting coefficients for codebook calculation are at least transmitted to a network side

Related U.S. Application Data continuation of application No. PCT/CN2019/070708, filed on Jan. 7, 2019.

(58) Field of Classification Search
CPC .. H04B 12/122; H04B 7/0456; H04B 7/0626; H04B 7/0639; H04B 7/063; H04B 7/0634; H04B 7/0478; H04B 7/0417; H04W 12/02; H04W 16/28; H04W 72/046; H04W 76/27
USPC ........................................ 375/267, 260, 262
See application file for complete search history.

(56) References Cited

U.S. PATENT DOCUMENTS

| | | | |
|---|---|---|---|
| 2018/0167116 A1 | 6/2018 | Rahman et al. | |
| 2018/0262253 A1 | 9/2018 | Rahman et al. | |
| 2019/0123796 A1 | 4/2019 | Jin et al. | |
| 2019/0149214 A1 | 5/2019 | Rahman et al. | |
| 2020/0145071 A1* | 5/2020 | Brown ................. | H04B 7/0639 |
| 2021/0266053 A1* | 8/2021 | Grossmann .......... | H04B 7/0626 |
| 2023/0131977 A1* | 4/2023 | Effler .................... | B64C 39/024 |
| | | | 382/254 |

FOREIGN PATENT DOCUMENTS

| | | |
|---|---|---|
| WO | 2018164537 A1 | 9/2018 |
| WO | 2018202134 A1 | 11/2018 |

OTHER PUBLICATIONS

Qualcomm Incorporated. "On Type I CSI Feedback", 3GPP TSG RAN WG1 #89 R1-1708592, May 19, 2017 (May 19, 2017).
Samsung: "Type II CSI reporting", [Online] Apr. 2, 2017 (Apr. 2, 2017), 3GPP Draft; R1-1705349 Type II CSI Reporting, 3rd Generation Partnership Project (3GPP), Mobile Competence Centre; 650, Route Des Lucioles; F-06921 Sophia-Antipolis Cedex; France, XP051243479.
Supplementary European Search Report in the European application No. 19909475.6, dated Nov. 16, 2021.
3GPP TSG RAN WG1 Meeting #88bis R1-1705076, Spokane, USA, Apr. 3-7, 2017; Agenda Item: 8.1.2.3.5; Source: Huawei, HiSilicon; Title: Design for Type II Feedback.
First Office Action of the Chinese application No. 202110723937.1, dated Jan. 17, 2022.
Written Opinion of the International Search Authority in the international application No. PCT/CN2019/070708, dated Sep. 27, 2019.
First Office Action of the European application No. 19909475.6, dated Sep. 2, 2022.
Non-Final Office Action of the U.S. Appl. No. 17/361,777, dated Apr. 26, 2022. 14 pages.
Notice of Allowance of the U.S. Appl. No. 17/361,777, dated Oct. 19, 2022. 7 pages.
Corrected Notice of Allowance of the U.S. Appl. No. 17/361,777, dated Nov. 14, 2022. 6 pages.
Second Office Action of the European application No. 19909475.6, dated Mar. 3, 2023.

\* cited by examiner

| Magnitude value | M=2 | |
|---|---|---|
| | 0 | 1 |
| L=4  0 | 0.50 | 0.01 |
| 1 | 0.20 | 0.01 |
| 2 | 0.01 | 0.01 |
| 3 | 0.01 | 0.01 |
| 4 | 0.01 | 0.10 |
| 5 | 0.01 | 0.01 |
| 6 | 0.01 | 0.01 |
| 7 | 0.01 | 0.01 |

FIG. 3

| Level | Magnitude | Code |
|---|---|---|
| 0 | 0 | 0 |
| 1 | 0.13 | 1001 |
| 2 | 0.18 | 1010 |
| 3 | 0.25 | 1011 |
| 4 | 0.35 | 1100 |
| 5 | 0.5 | 1101 |
| 6 | 0.71 | 1110 |
| 7 | 1 | 1111 |

FIG. 4

| Magnitude quantization | M=2 | |
|---|---|---|
| | 0 | 1 |
| 0 | 1101 | 0 |
| 1 | 1010 | 0 |
| 2 | 0 | 0 |
| 3 | 0 | 0 |
| 4 | 0 | 1001 |
| 5 | 0 | 0 |
| 6 | 0 | 0 |
| 7 | 0 | 0 |

| Level | Magnitude | Code |
|---|---|---|
| 0 | 0 | 0 |
| 1 | 0.13 | 100 |
| 2 | 0.18 | 101 |
| 3 | 0.25 | 1100 |
| 4 | 0.35 | 1101 |
| 5 | 0.5 | 1110 |
| 6 | 0.71 | 11110 |
| 7 | 1 | 11111 |

FIG. 6

| Magnitude quantization | M=2 | |
| --- | --- | --- |
| | 0 | 1 |
| 0 | 1110 | 0 |
| 1 | 101 | 0 |
| 2 | 0 | 0 |
| 3 | 0 | 0 |
| 4 | 0 | 100 |
| 5 | 0 | 0 |
| 6 | 0 | 0 |
| 7 | 0 | 0 |

| Level | Magnitude | Code |
| --- | --- | --- |
| 0 | 0.1 | 000 |
| 1 | 0.14 | 001 |
| 2 | 0.2 | 010 |
| 3 | 0.28 | 011 |
| 4 | 0.38 | 100 |
| 5 | 0.52 | 101 |
| 6 | 0.72 | 110 |
| 7 | 1 | 111 |

CODEBOOK PROCESSING METHOD, TERMINAL DEVICE AND NETWORK DEVICE

CROSS-REFERENCE

This is a continuation of U.S. patent application Ser. No. 17/361,777, filed on Jun. 29, 2021, which is a continuation application of International Patent Application No. PCT/CN2019/070708, filed on Jan. 7, 2019, the entire contents of these applications are incorporated herein by reference in its entirety.

TECHNICAL FIELD

The present disclosure relates to the technical field of information processing, and more particularly, to a method for codebook processing, a terminal device, a network device, a computer storage medium, a chip, a computer readable storage medium, a computer program product and a computer program.

BACKGROUND

The existing NR type II codebook encodes independently in the frequency domain, and the total feedback amount is too large due to high spatial quantization accuracy. By feedback of a frequency domain-spatial joint codebook, the feedback amount can be greatly saved while the NR performance is ensured. R16 NR type II codebook may be represented as $W = W_1 \hat{W}_2 W_f^H$, where $W_1$ indicates 2L spatial beams, $W_f^H$ indicates M discrete fourier transform (DFT) basis vectors and $\hat{W}_2$ are weighting coefficients. At present, it is a problem to be solved to process parameters reported by a terminal device to a network side, especially non-quantized weighting coefficients, in order to reduce a length of the reported message.

SUMMARY

To solve the above technical problem, the embodiments of the present disclosure provide a method for codebook processing, a terminal device, a network device, a computer storage medium, a chip, a computer readable storage medium, a computer program product and a computer program.

According to a first aspect of the disclosure, a method for codebook processing is provided, which is applied to a terminal device and includes the following operations.

Non-quantized weighting coefficients for codebook calculation are at least determined based on a first number and a second number.

Quantization processing is performed on the non-quantized weighting coefficients to obtain quantized weighting coefficients.

The quantized weighting coefficients for codebook calculation are at least transmitted to a network side.

According to a second aspect of the disclosure, a method for codebook processing is provided, which is applied to a network device and includes the following operations.

Information including quantized weighting coefficients for codebook calculation is received from a terminal device.

A corresponding codebook is determined based on information of the quantized weighting coefficients, and downlink channel information of the terminal device is determined based on the determined codebook.

According to a third aspect of the disclosure, a terminal device is provided, which includes a first processing unit and a first communication unit.

The first processing unit is configured to at least determine non-quantized weighting coefficients for codebook calculation based on a first number and a second number, and perform quantization processing on the non-quantized weighting coefficients to obtain quantized weighting coefficients.

The first communication unit is configured to at least transmit the quantized weighting coefficients for codebook calculation to a network side.

According to a fourth aspect of the disclosure, a network device is provided, which includes a second communication unit and a second processing unit.

The second communication unit is configured to receive information including quantized weighting coefficients for codebook calculation from a terminal device.

The second processing unit is configured to determine a corresponding codebook based on information of the quantized weighting coefficients, and determine downlink channel information of the terminal device based on the determined codebook.

According to a fifth aspect of the disclosure, a terminal device is provided, which includes a processor and a memory. The memory is configured to store a computer program, and the processor is configured to call and run the computer program stored in the memory to execute the method in the first aspect or any possible implementation mode of the first aspect.

According to a sixth aspect of the disclosure, a network device is provided, which includes a processor and a memory. The memory is configured to store a computer program, and the processor is configured to call and run the computer program stored in the memory to execute the method in the second aspect or any possible implementation mode of the second aspect.

According to a seventh aspect of the disclosure, a chip is provided, which is configured to implement the method in any one of the first aspect or the third aspect or any possible implementation mode of the first or third aspect.

Specifically, the chip includes a processor. The processor is configured to call a computer program from a memory and run the computer program, to cause a device mounted with the chip to execute the method in any one of the first or second aspect or any possible implementation mode of the first or second aspect.

According to an eighth aspect of the disclosure, a computer readable storage medium for storing a computer program is provided. The computer program enables a computer to execute the method in any one of the first or second aspect or any possible implementation mode of the first or second aspect.

According to a ninth aspect of the disclosure, a computer program product is provided, which includes a computer program instruction. The computer program instruction enables a computer to execute the method in any one of the first or second aspect or any possible implementation mode of the first or second aspect.

According to a tenth aspect of the disclosure, a computer program is provided. The computer program, when run on a computer, enables a computer to execute the method in any one of the first or second aspect or any possible implementation mode of the first or second aspect.

With the above solutions, quantization processing can be performed on the weighting coefficients required for codebook calculation and the weighting coefficients subjected to the quantization processing can be reported, so as to reduce a length of the reported message when the relevant parameters of codebook calculation are reported and obtain a compromise in performance overhead.

BRIEF DESCRIPTION OF THE DRAWINGS

FIG. 3 is a schematic diagram of a non-quantized weighting coefficient list according to an embodiment of the present disclosure.

FIG. 4 is a schematic diagram of a first amplitude quantization level table according to an embodiment of the present disclosure.

FIG. 5 is a first schematic diagram of a quantization result according to an embodiment of the present disclosure.

FIG. 6 is a schematic diagram of a second amplitude quantization level table according to an embodiment of the present disclosure.

FIG. 7 is a second schematic diagram of a quantization result according to an embodiment of the present disclosure.

FIG. 8 is a schematic diagram of a third amplitude quantization level table according to an embodiment of the present disclosure.

DETAILED DESCRIPTION

In order to understand the features and technical contents of the embodiments of the present disclosure in more detail, implementation of the embodiments of the present disclosure will be described in detail with reference to the accompanying drawings. The accompanying drawings are provided for purposes of illustration only and are not intended to limit the embodiments of the present disclosure.

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system, a 5G system and the like.

Figure 1:
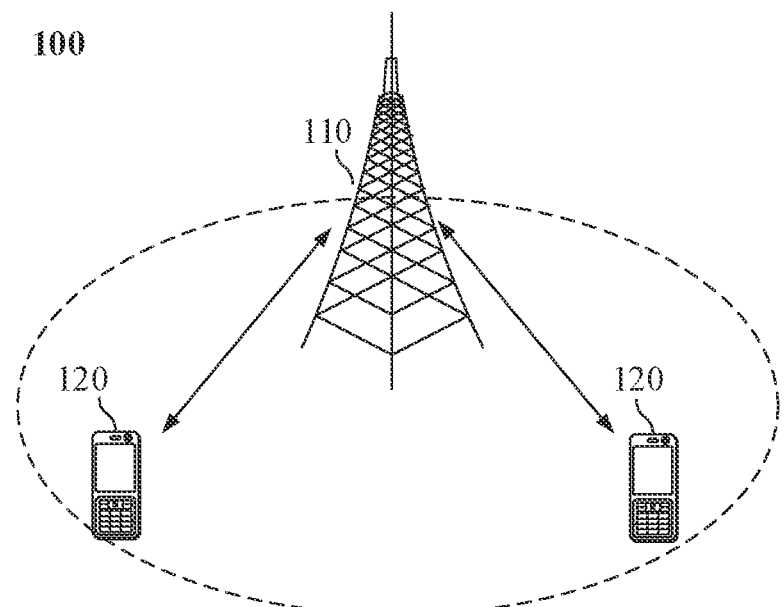
FIG. 1 is a first schematic diagram of a communication system architecture according to an embodiment of the present disclosure.

Exemplarily, a communication system 100 to which the embodiments of the present disclosure are applied is illustrated in FIG. 1. The communication system 100 may include a network device 110. The network device 110 may be a device communicating with a terminal device 120 (also referred to as a communication terminal, a terminal). The network device 110 may provide communication coverage for a specific geographic area and may communicate with a terminal device within the coverage area. In at least one example, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN), or the network device may be a mobile switching center, a relay station, an access point, a vehicle-mounted device, a wearable device, a hub, a switch, a bridge, a router, a network-side device in a 5G network, a network device in a future evolved Public Land Mobile Network (PLMN) or the like.

The communication system 100 also includes at least one terminal device 120 located within the coverage of the network device 110. The "terminal device" used herein includes, but is not limited to, connection via wired lines, such as connection via Public Switched Telephone Networks (PSTN), Digital Subscriber Line (DSL), digital cables, direct cables; and/or another data connection/network; and/or via a wireless interface, such as for a cellular network, a Wireless Local Area Network (WLAN), a digital television network such as DVB-H network, a satellite network, a AM-FM broadcast transmitter; and/or means of another terminal device arranged to receive/transmit a communication signal; and/or an Internet of Things (IoT) device. A terminal device configured to communicate via a wireless interface may be referred to as a "wireless communication terminal", "wireless terminal" or "mobile terminal". Examples of mobile terminals include, but are not limited to, satellite or cellular telephones; a Personal Communications System (PCS) terminal that may combine a cellular radio telephone with data processing, fax and data communications capability; a Personal Digital Assistant (PDA) that may include a radio telephone, a pager. Internet/intranet access, a Web browser, memo pad, calendar and/or Global Positioning System (GPS) receiver; and a conventional laptop and/or palmtop receiver or other electronic devices including a radio telephone transceiver. The terminal device may be referred to an access terminal, a User Equipment (UE), a subscriber unit, a subscriber station, a mobile station, a mobile radio station, a remote station, a remote terminal, a mobile device, a user terminal, a terminal, a wireless communication device, a user agent or a user device. The access terminal may be a cellular telephone, a cordless telephone, a Session Initiation Protocol (SIP) telephone, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in a 5G network, a terminal device in a future evolved PLMN or the like.

In one example, Device to Device (D2D) communication may be performed between the terminal devices 120.

In one example, the 5G system or 5G network may also be referred to as a New Radio (NR) system or NR network.

FIG. 1 exemplarily illustrates one network device and two terminal devices. In one example, the communication system 100 may include multiple network devices and another number of terminal devices may be included within the coverage of each network device, which is not limited by the embodiments of the present disclosure.

In one example, the communication system 100 may also include other network entity such as a network controller or a mobility management entity, which is not limited in the embodiments of the present disclosure.

It is to be understood that a device with communication function in the network/system in the embodiments of the present disclosure may be referred to as a communication device. Taking the communication system 100 illustrated in FIG. 3 as an example, the communication device may include the network device 110 and the terminal device 120 with the communication function. The network device 110 and the terminal device 120 may be specific devices mentioned above, and details are not described herein. The communication device may also include other devices in the communication system 100, for example, other network entity such as a network controller or a mobility management entity, which is not limited in the embodiments of the present disclosure.

It is to be understood that terms "system" and "network" in the disclosure may usually be exchanged. In the disclosure, the term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

In order to understand the features and technical contents of the embodiments of the present disclosure in more detail, the implementation of the embodiments of the present disclosure will be described in detail with reference to the accompanying drawings. The accompanying drawings are provided for illustration only and are not intended to limit the embodiments of the present disclosure.

First Embodiment

Figure 2:
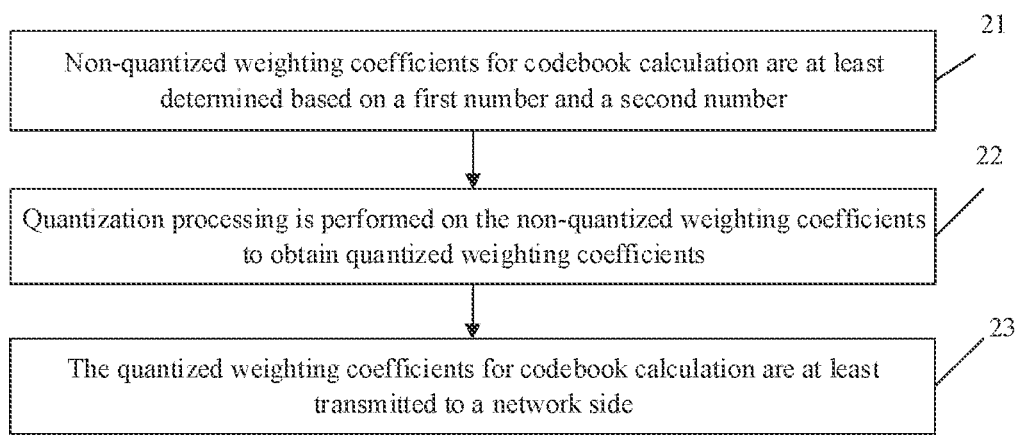
FIG. 2 is a first schematic flowchart of a method for codebook processing according to an embodiment of the present disclosure.

The present embodiment provides a method for codebook processing, which is applied to a terminal device. As illustrated in FIG. 2, the method includes the following operations.

In 21, non-quantized weighting coefficients for codebook calculation are at least determined based on a first number and a second number.

In 22, quantization processing is performed on the non-quantized weighting coefficients to obtain quantized weighting coefficients.

In 23, the quantized weighting coefficients for codebook calculation are at least transmitted to a network side.

The first number and the second number may be L and M, respectively. The value of L is half of the number of spatial beams, and the value of M is the number of DFT basis vectors. L and M are both integers.

The operation in 21 that the non-quantized weighting coefficients for codebook calculation are at least determined based on the first number and the second number may include the following actions.

$W_1$, $W_f^H$ and the non-quantized weighting coefficients are calculated based on the first number and the second number (i.e., the values of L and M).

$W_1$ indicates 2L spatial beams and $W_f^H$ indicates M DFT basis vectors.

The non-quantized weighting coefficients may be $\hat{W}_2$, i.e., (2L*M), which indicates weighting coefficients of any spatial beam and frequency domain DFT vector pair.

In the present embodiment, it is necessary to perform quantization on the non-quantized weighting coefficients. Specifically, there may be three processing scenarios.

First Processing Scenario

The operation that quantization processing is performed on the non-quantized weighting coefficients includes the following actions. It is successively determined whether an amplitude corresponding to a non-quantized weighting coefficient to be processed is zero based on a preset order.

Responsive to that the amplitude is non-zero, a non-zero amplitude of the non-quantized weighting coefficient is quantized into a coded value. Responsive to that the amplitude is zero, a zero amplitude of the non-quantized weighting coefficient is quantized into a first value of 1 bit.

The operation that the non-zero amplitude of the non-quantized weighting coefficient is quantized into the coded value includes the following actions.

A coded value of the non-zero amplitude of the non-quantized weighting coefficient is determined based on a preset first amplitude quantization level table.

A first bit in the coded value of the non-zero amplitude of the non-quantized weighting coefficient is a second value, and the second value is different from the first value.

That is, corresponding to different quantization levels, the non-zero amplitude is quantized with A bits and the phase is quantized with B bits, and the zero amplitude (lowest level) is quantized with 1 bit.

Regarding the order of quantization, quantization may be performed one by one in the order of from row to column or from column to row. The number of rows may be 2L and each row includes M non-quantized weighting coefficients. The order of from row to column refers to that the quantization starts to be performed from the left-most (or the first) non-quantized weighting coefficient of the first row, until the Mth non-quantized weighting coefficient of the 2L-th row.

Quantization processing is performed on the amplitude and phase of each non-quantized weighting coefficient, and the phase is not described in detail in the present embodiment. The following focuses on quantization on the amplitude.

When the present non-quantized weighting coefficient to be processed is a non-zero quantized element, a corresponding coded value is determined based on the preset first amplitude quantization level table when a message is reported, and each coded value may indicate by the second value of the first bit that the quantized element is a non-zero quantized element. When an amplitude of a non-quantized weighting coefficient to be quantized corresponding to the present non-quantized weighting coefficient is zero, the first value is used to indicate that the quantized element is a zero quantized element.

The first value is different from the second value. For example, the first value may be zero and the second value may be 1, or vice versa, which is not exhaustive herein.

Assuming that the first value is zero and the second value is 1, it indicates that the first bit is 1 and the amplitude A and phase B are quantized correspondingly when the quantized weighting coefficient is non-zero amplitude; and a zero bit (bit 0) is appended when there is no non-zero quantization element in the position.

Both A and B are integers, and the number of bits used to represent the integers may be set according to the actual condition. Details are not described in the present embodiment.

Correspondingly, the quantized weighting coefficients for codebook calculation are at least transmitted to the network side. A total CSI message length (included in the CSI part1) and a sequence including the quantized weighting coefficients may be reported for the terminal device. The reported message may be set according to the actual condition.

For example, referring to FIGS. 3, 4 and 5, it is assumed that L=4 and M=2. FIG. 3 illustrates $\hat{W}_2$, i.e., non-quantized weighting coefficients, includes 2*8 elements.

FIG. 4 illustrates the first amplitude quantization level table, in which coded values corresponding to multiple non-quantized amplitudes are illustrated.

FIG. 5 illustrates that, after each non-quantized weighting coefficient in FIG. 3 is quantized by using the first amplitude quantization level table in FIG. 4, a corresponding quantized weighting coefficient is obtained. The non-zero amplitude corresponds to a coded value and the first bit of each coded value is the second value; and the zero amplitude is directly set as the first value, i.e., 0.

Accordingly, the finally reported amplitude quantization sequence may include: [1010]0000000000[1001]000 and the total sequence length is reported in the first part of the CSI.

Second Processing Scenario

The operation that quantization processing is performed on the non-quantized weighting coefficients includes the following actions. It is successively determined whether an amplitude corresponding to a non-quantized weighting coefficient to be processed is zero based on a preset order.

Responsive to that the amplitude is non-zero, a non-zero amplitude of the non-quantized weighting coefficient is quantized into a coded value. Responsive to that the amplitude is zero, a zero amplitude of the non-quantized weighting coefficient is quantized into a first value of 1 bit.

The operation that the non-zero amplitude is quantized into the coded value includes the following actions.

A coded value of the non-zero amplitude is determined based on a preset second amplitude quantization level table.

The second amplitude quantization level table satisfies immediate decodability.

The difference of the second processing scenario from the first processing scenario is that a different quantization level table is used in the present scenario, and the quantization level table used in the present scenario satisfies immediate decodability. That is, in the second amplitude quantization level table, different quantization levels correspond to different coded values and any element in any codeword set is not a prefix of another element.

Regarding the order of quantization, quantization may be performed one by one in the order of from row to column or from column to row. The number of rows may be 2L and each row includes M non-quantized weighting coefficients. The order of from row to column refers to that the quantization starts to be performed from the left-most (or the first) non-quantized weighting coefficient of the first row, until the Mth non-quantized weighting coefficient of the 2L-th row.

Quantization processing is performed on the amplitude and phase of each non-quantized weighting coefficient, and the phase is not described in detail in the present embodiment. The following focuses on quantization on the amplitude.

The terminal device performs quantization processing on $\hat{W}_2$ based on the predefined second amplitude quantization level table, and the amplitude-phase quantization level table satisfies immediate decodability.

Corresponding to different quantization levels, the quantization lengths of the amplitude of A bits and the phase of B bits are not required to be the same, and the zero amplitude (lowest level) is quantized with 1 bit.

Quantization information of each element is appended in the order of from row to column (or from column to row).

Correspondingly, the quantized weighting coefficients for codebook calculation are at least transmitted to the network side. A total CSI message length (included in the CSI part1) and a sequence including the quantized weighting coefficients may be reported for the terminal device. The reported message may be set according to the actual condition.

For example, referring to FIGS. 3, 6 and 7, a non-quantized weighting coefficient matrix may also refer to FIG. 3. It is assumed that L=4 and M=2 and $\hat{W}_2$ is the same as that illustrated in FIG. 3, that is, it is consistent with the example description in the first processing scenario, which will not be elaborated herein.

The preset second amplitude quantization level table in the present processing scenario is illustrated in FIG. 6. In FIG. 6, the first N bits of coded values corresponding to different non-zero amplitudes are different, that is, the first three bits are different in FIG. 6.

Combined with the second amplitude quantization level table illustrated in FIG. 6, after processing is performed on the non-quantized weighting coefficients illustrated in FIG. 3, the coded values illustrated in FIG. 7 are obtained.

The finally reported sequence is (including amplitude only) [1110][101]0000000000[100]000 and the total sequence length is reported in the first part of the CSI.

Third Processing Scenario

The present processing scenario is different from the first two processing scenarios. In the present scenario, processing is not performed on a zero amplitude but only on a non-zero element, that is, processing is performed on a non-zero amplitude.

Specifically, the operation that quantization processing is performed on the non-quantized weighting coefficients to obtain the quantized weighting coefficients includes the following actions.

Based on a preset third amplitude quantization level table, coded values of the non-quantized weighting coefficients for codebook calculation are determined and used as the quantized weighting coefficients.

K quantized weighting coefficients with non-zero amplitudes are selected from the quantized weighting coefficients, K being an integer greater than or equal to 1.

The operation that the quantized weighting coefficients for codebook calculation are at least transmitted to the network side includes the following actions.

K is added into a first part of CSI, and K coded values and positions of the K coded values are added into a second part of the CSI. The CSI is transmitted to the network side.

That is, the terminal device selects K non-zero elements to report based on the sparsity of the non-quantized weighting coefficients.

The K reported elements are quantized based on the amplitude A and phase B bits.

The terminal device reports K (K may be a specific value or an indicator) in CSI part1 (the first part). The positions of the K non-zero elements in 2LM are reported in CSI part 2 (the second part), and the K (non-zero) amplitude-phase quantized values are reported in order.

Further, the above K may be long-term feedback. That is, the K value is reported at each reporting. The K coded values and the corresponding positions may not be transmitted at each reporting. The positions of the K non-zero elements in the 2LM may be similar to the combinatorial number.

The third amplitude quantization level table in the present scenario may be consistent with the first amplitude quantization level table provided in the first scenario, or may be consistent with the second amplitude quantization level table provided in the second scenario, or may also be another type of a table, which is not exhaustive in the present embodiment.

For example, referring to FIGS. 3 and 8, the non-quantized weighting coefficients may be illustrated in FIG. 3, that is, L=4. M=2 and $\hat{W}_2$ is consistent with the above $\hat{W}_2$, which will not be elaborated again.

FIG. 8 is a list of coded values corresponding to non-zero amplitudes of different non-quantized weighting coefficients.

Based on FIGS. 3 and 8, it may be determined that the value of K to be reported is 3, the positions of K non-zero elements in the 2LM, such as [0, 1, 12]=>549, and K amplitude values (K=3) are [101][010][000].

With the above solutions, quantization processing can be performed on the weighting coefficients required for codebook calculation, so as to reduce a length of the reported message when the relevant parameters of codebook calculation are reported and obtain a compromise in performance overhead.

Second Embodiment

Figure 9:
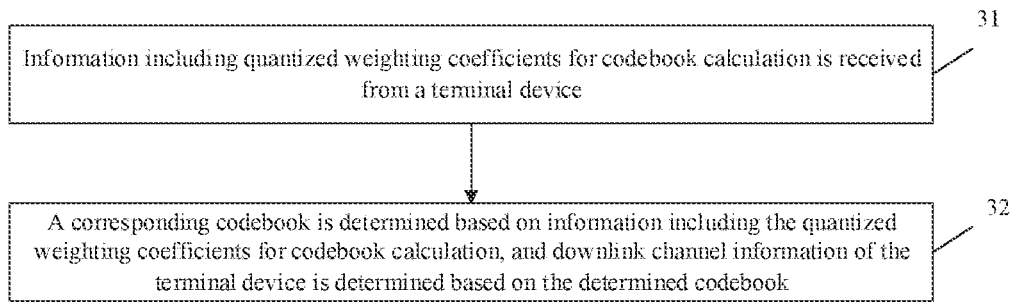
FIG. 9 is a second schematic flowchart of a method for codebook processing according to an embodiment of the present disclosure.

The present embodiment provides a method for codebook processing, which is applied to a network device. As illustrated in FIG. 9, the method includes the following operations.

In 31, information including quantized weighting coefficients for codebook calculation is received from a terminal device.

In 32, a corresponding codebook is determined based on information of the quantized weighting coefficients, and downlink channel information of the terminal device is determined based on the determined codebook.

The operation that the information including the quantized weighting coefficients for codebook calculation is received from the terminal device may include the following action.

$W_1$, $W_f^H$ and non-quantized weighting coefficients are received from the terminal device.

$W_1$ indicates 2L spatial beams and $W_f^H$ indicates M DFT basis vectors.

The non-quantized weighting coefficients may be $\hat{W}_2$, i.e., (2L*M), which indicates weighting coefficients of any spatial beam and frequency domain DFT vector pair.

In the present embodiment, it is necessary to perform quantization on the non-quantized weighting coefficients. Specifically, there may be the following three processing scenarios.

First Processing Scenario

Bits of a sequence including the quantized weighting coefficients for codebook calculation are successively parsed.

Responsive to that a parsed bit is a second value, a corresponding non-quantized weighting coefficient is determined based on a coded value of a quantized weighting coefficient and a first amplitude quantization level table.

Responsive to that the parsed bit is a first value, it is determined that an amplitude of the corresponding non-quantization weighting coefficient is zero.

That is, bits are successively extracted from the sequence, and it is determined whether the extracted bit is the first value or the second value.

Responsive to that the present parsed bit is the second value, it indicates that A+B bits following the bit are a coded value and a corresponding phase value of the non-zero amplitude, respectively. For example, when the bit is 1, the A+B bits following the bit indicate the amplitude and phase messages of the position (in the order of from row to column). A and B are both integers and A and B are not necessarily the same.

Responsive to that the present parsed bit is the first value, it indicates that the amplitude of the non-quantized weighting coefficient corresponding to the bit is zero. For example, when the bit is zero, it indicates that zero is added at the position.

The above processing is cyclically performed until all the coded values in the sequence are parsed. For example, when 2L*M elements are included, all of them need to be decoded.

It is also to be noted that the above parsing method for the coded value of the non-zero amplitude may be determined based on the first amplitude quantization level table. The first amplitude quantization level table is the same as that in the first embodiment and will not be described again.

In addition, the relationship between the sequence of the weighting coefficients and the positions of the non-quantized weighting coefficients may follow the order of from left to right or from top to bottom. For example, the first parsed non-quantized weighting coefficient is the first amplitude value of the first row and the second non-quantized weighting coefficient is the second amplitude value of the first row.

Second Processing Scenario

A sequence including quantized weighting coefficients for codebook calculation is acquired based on a CSI message length.

At least one bit is successively extracted from the sequence until the extracted at least one bit has a target coded value matched with a preset second amplitude quantization level table.

A corresponding non-quantized weighting coefficient is determined based on the target coded value.

The second amplitude quantization level table satisfies immediate decodability.

The difference of the second processing scenario from the first processing scenario is that a different quantization level table is used in the present scenario, and the quantization level tables used in the present scenario satisfy immediate decodability. That is, in the second amplitude quantization level table, different quantization levels correspond to different coded values and any element in any codeword set is not a prefix of another element.

Specifically, the corresponding quantization sequence may be decoded through the reported CSI message length.

Each bit is read in a buffer until the read bit sequence is a coded value in the second amplitude quantization level table; and the amplitude value corresponding to the coded value is determined based on the second amplitude quantization level table.

After the amplitude (and phase value) is decoded, the buffer is flushed and the above processing continues until all the contents in the sequence are parsed out.

In addition, the relationship between the sequence of the weighting coefficients and the positions of the non-quantized weighting coefficients may follow the order of from left to right or from top to bottom. For example, the first parsed non-quantized weighting coefficient is the first amplitude value of the first row and the second non-quantized weighting coefficient is the second amplitude value of the first row.

Third Processing Scenario

The present processing scenario is different from the first two processing scenarios. In the present scenario, processing is not performed on a zero amplitude but only on a non-zero element, that is, processing is performed on a non-zero amplitude.

Specifically, a position corresponding to K coded values is parsed, and K coded values corresponding to each position is acquired.

Non-quantized weighting coefficients and corresponding positions of the non-quantized weighting coefficients are determined based on the K coded values and a third amplitude quantization level table.

The third amplitude quantization level table in the present scenario may be consistent with the first amplitude quantization level table provided in the first scenario, or may be consistent with the second amplitude quantization level table provided in the second scenario, or may also be another type of a table, which is not exhaustive in the present embodiment.

For example, the network device receives K value and positions of K elements, and determines the amplitude value of the non-quantized weighting coefficient corresponding to each coded value based on a preset quantization level table.

The positions of the K elements (i.e., the quantized weighting coefficients) may be in a one-to-one correspondence with the coded values. That is, the first parsed position indicates the position of the acquired first coded value. Further, the amplitude value corresponding to the coded value is determined based on the third amplitude quantization level table, and the amplitude value is added to the corresponding position.

Finally, it is to be noted that the network device may obtain the downlink channel information through $W=W_1 \hat{W}_2 W_f^H$ calculation. The specific calculation method is not described in detail in the present embodiment.

With the above solutions, quantization processing can be performed on the weighting coefficients required for codebook calculation, so as to reduce a length of the reported message when the relevant parameters of codebook calculation are reported and obtain a compromise in performance overhead.

Third Embodiment

Figure 10:
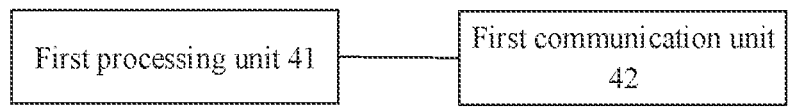
FIG. 10 is a schematic structural diagram of a terminal device according to an embodiment of the present disclosure.

The present embodiment provides a terminal device. As illustrated in FIG. 10, the terminal includes a first processing unit 41 and a first communication unit 42.

The first processing unit 41 is configured to at least determine non-quantized weighting coefficients for codebook calculation based on a first number and a second number, and perform quantization processing on the non-quantized weighting coefficients to obtain quantized weighting coefficients.

The first communication unit 42 is configured to at least transmit the quantized weighting coefficients for codebook calculation to a network side.

The first number and the second number may be L and M, respectively. The value of L is half of the number of spatial beams, and the value of M is the number of DFT basis vectors.

The first processing unit 41 is configured to calculate $W_1$, $W_f^H$ and the non-quantized weighting coefficients based on the first number and the second number (i.e., the values of L and M).

$W_1$ indicates 2L spatial beams and $W_f^H$ indicates M DFT basis vectors.

The non-quantized weighting coefficients may be $\hat{W}_2$, i.e., (2L*M), which indicates weighting coefficients of any spatial beam and frequency domain DFT vector pairs.

In the present embodiment, it is necessary to perform quantization on the non-quantized weighting coefficients. Specifically, there may be the following three processing scenarios.

First Processing Scenario

The first processing unit 41 is configured to successively determine whether an amplitude corresponding to a non-quantized weighting coefficient to be processed is zero based on a preset order, quantize a non-zero amplitude of the non-quantized weighting coefficient into a coded value responsive to that the amplitude is non-zero, and quantize a zero amplitude of the non-quantized weighting coefficient into a first value of 1 bit responsive to that the amplitude is zero.

The first processing unit 41 is configured to determine a coded value of the non-zero amplitude of the non-quantized weighting coefficient based on a preset first amplitude quantization level table.

A first bit in the coded value of the non-zero amplitude of the non-quantized weighting coefficient is a second value that is different from the first value.

That is, corresponding to different quantization levels, the non-zero amplitude is quantized with A bits and the phase is quantized with B bits, and the zero amplitude (lowest level) is quantized with 1 bit.

Regarding the order of quantization, quantization may be performed one by one in the order of from row to column or from column to row. The number of rows may be 2L and each row includes M non-quantized weighting coefficients. The order of from row to column refers to that the quantization starts to be performed from the left-most (or the first) non-quantized weighting coefficient of the first row, until the Mth non-quantized weighting coefficient of the 2L-th row.

Quantization processing is performed on the amplitude and phase of each non-quantized weighting coefficient, and the phase is not described in detail in the present embodiment. The following focuses on quantization on the amplitude.

When the present non-quantized weighting coefficient to be processed is a non-zero quantized element, a corresponding coded value is determined based on the preset first amplitude quantization level table when a message is reported, and each coded value may indicate by the second value of the first bit that the quantized element is a non-zero quantized element. When an amplitude of a non-quantized weighting coefficient to be quantized corresponding to the present non-quantized weighting coefficient is zero, the first value is used to indicate that the quantized element is a zero quantized element.

The first value is different from the second value. For example, the first value may be zero and the second value may be 1, or vice versa, which is not exhaustive herein.

Assuming that the first value is zero and the second value is 1, it indicates that the first bit is 1 and the amplitude A and phase B are quantized correspondingly when the quantized weighting coefficient is non-zero amplitude; and a zero bit (bit 0) is appended when there is no non-zero quantization element in the position.

Both A and B are integers, and the number of bits used to represent the integers may be set according to the actual condition. Details are not described in the present embodiment.

Correspondingly, the first communication unit 42 is configured to at least transmit the quantized weighting coefficients for codebook calculation to the network side. A total CSI message length (included in the CSI part1) and a sequence including the quantized weighting coefficients may be reported for the terminal device. The reported message may be set according to the actual condition.

For example, referring to FIGS. 3, 4 and 5, it is assumed that L=4 and M=2. FIG. 3 illustrates $\hat{W}_2$, i.e., non-quantized weighting coefficients, includes 2*8 elements.

FIG. 4 illustrates the first amplitude quantization level table in which coded values corresponding to multiple non-quantized amplitudes are illustrated.

FIG. 5 illustrates that, after each non-quantized weighting coefficient in FIG. 3 is quantized by using the first amplitude quantization level table in FIG. 4, a corresponding quantized weighting coefficient is obtained. The non-zero amplitude corresponds to the coded value and the first bit of each coded value is the second value. The zero amplitude is directly set as the first value, i.e., 0.

Accordingly, the finally reported amplitude quantization sequence may include: [1010]00000000000[1001]000 and the total sequence length is reported in the first part of the CSI.

Second Processing Scenario

The first processing unit 41 is configured to successively determine whether an amplitude corresponding to a non-quantized weighting coefficient to be processed is zero based on a preset order, quantize a non-zero amplitude of the non-quantized weighting coefficient into a coded value responsive to that the amplitude is non-zero, and quantize a zero amplitude of the non-quantized weighting coefficient into a first value of 1 bit responsive to that the amplitude is zero.

The first processing unit 41 is configured to determine a coded value of the non-zero amplitude based on a preset second amplitude quantization level table The second amplitude quantization level table satisfies immediate decodability.

The difference of the second processing scenario from the first processing scenario is that a different quantization level table is used in the present scenario, and the quantization level table used in the present scenario satisfies immediate decodability. That is, in the second amplitude quantization level table, different quantization levels correspond to different coded values and the first N bits of different coded values are different. For example, the first three bits of each coded value may be different from each other.

Regarding the order of quantization, quantization may be performed one by one in the order of from row to column or from column to row. The number of rows may be 2L and each row includes M non-quantized weighting coefficients. The order of from row to column refers to that the quantization starts to be performed from the left-most (or the first) non-quantized weighting coefficient of the first row, until the Mth non-quantized weighting coefficient of the 2L-th row.

Quantization processing is performed on the amplitude and phase of each non-quantized weighting coefficient, and the phase is not described in detail in the present embodiment. The following focuses on quantization of amplitude.

Quantization processing is performed on $\hat{W}_2$ based on the predefined second amplitude quantization level table, and the amplitude-phase quantization level table satisfies immediate decodability.

Corresponding to different quantization levels, the quantization lengths of the amplitude of A bits and the phase of B bits are not required to be the same, and the zero amplitude (lowest level) is quantized with 1 bit.

Quantization information of each element is appended by using the order of from row to column (or from column to row).

Correspondingly, the first communication unit 42 is configured to at least transmit the quantized weighting coefficients for codebook calculation to the network side. A total CSI message length (included in the CSI part1) and a sequence including the quantized weighting coefficients may be reported. The reported message may be set according to the actual condition.

For example, referring to FIGS. 3, 6 and 7, a non-quantized weighting coefficient matrix may also refer to FIG. 3. It is assumed that L=4 and M=2 and $\hat{W}_2$ is the same as that illustrated in FIG. 3, that is, it is consistent with the example description in the first processing scenario, which will not be elaborated herein.

The preconfigured second amplitude quantization level table in the present processing scenario is illustrated in FIG. 6. In FIG. 6, the first N bits of coded values corresponding to different non-zero amplitudes are different, that is, the first three bits are different in FIG. 6.

Combined with the second amplitude quantization level table illustrated in FIG. 6, after processing is performed on the non-quantized weighting coefficients illustrated in FIG. 3, the coded values illustrated in FIG. 7 are obtained.

The finally reported sequence is (including amplitude only) [1110][101]0000000000[100]000 and the total sequence length is reported in the CSI part1.

Third Processing Scenario

The present processing scenario is different from the first two processing scenarios. In the present scenario, processing is not performed on a zero amplitude but only on a non-zero element, that is, processing is performed on a non-zero amplitude.

The first processing unit 41 is configured to determine coded values of the non-quantized weighting coefficients for codebook calculation based on a preset third amplitude quantization level table and use the coded values as the quantized weighting coefficients, and select K quantized weighting coefficients with non-zero amplitudes from the quantized weighting coefficients. K is an integer greater than or equal to 1.

The first communication unit 42 is configured to add K into a first part of CSI, add K coded values and positions of the K coded values into a second part of the CSI, and transmit the CSI to the network side.

That is, the terminal device selects K non-zero elements to report based on the sparsity of the non-quantized weighting coefficients.

The K reported elements are quantized based on the amplitude A and phase B bits.

The terminal device reports K (K may be a specific value or an indicator) in CSI part1 (the first part). The positions of the K non-zero elements in 2LM are reported in CSI part 2 (the second part), and the K (non-zero) amplitude-phase quantized values are reported in order.

Further, the above K may be long-term feedback. That is, the K value is reported at each reporting. The K coded values and the corresponding positions may not be transmitted at each reporting. The positions of the K non-zero elements in the 2LM may be similar to the combinatorial number.

The third amplitude quantization level table in the present scenario may be consistent with the first amplitude quantization level table provided in the first scenario, or may be consistent with the second amplitude quantization level table provided in the second scenario, or may also be another type of a table, which is not exhaustive in the present embodiment.

For example, referring to FIGS. 3 and 8, the non-quantized weighting coefficients may be illustrated in FIG. 3, that is, L=4, M=2 and $\hat{W}_2$ is consistent with the above $\hat{W}_2$, which will not be elaborated again.

FIG. 8 is a list of coded values corresponding to non-zero amplitudes of different non-quantized weighting coefficients.

Based on FIGS. 3 and 8, it may be determined that the value of K to be reported is 3, the positions of K non-zero elements in the 2LM, such as [0, 1, 12]=>549, and K amplitude values (K=3) are [101][010][000].

With the above solutions, quantization processing can be performed on the weighting coefficients required for codebook calculation, so as to reduce a length of the reported message when the relevant parameters of codebook calculation are reported and obtain a compromise in performance overhead.

Fourth Embodiment

Figure 11:
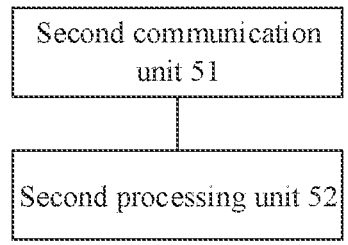
FIG. 11 is a schematic structural diagram of a network device according to an embodiment of the present disclosure.

The present embodiment provides a network device. As illustrated in FIG. 11, the network device includes a second communication unit 51 and a second processing unit 52.

The second communication unit 51 is configured to receive information including quantized weighting coefficients for codebook calculation from a terminal device.

The second processing unit 52 is configured to determine a corresponding codebook based on information of the quantized weighting coefficients, and determine downlink channel information of the terminal device based on the determined codebook.

The second communication unit 51 is configured to receive $W_1$, $W_f^H$ and non-quantized weighting coefficients from the terminal device.

$W_1$ indicates 2L spatial beams and $W_f^H$ indicates M DFT basis vectors.

The non-quantized weighting coefficients may be $\hat{W}_2$, i.e., (2L*M), which indicates weighting coefficients of any spatial beam and frequency domain DFT vector pair.

In the present embodiment, it is necessary to perform quantization on the non-quantized weighting coefficients. Specifically, there may be the following three processing scenarios.

First Processing Scenario

The second processing unit 52 is configured to successively parse bits of a sequence including the quantized weighting coefficients for codebook calculation, determine a corresponding non-quantized weighting coefficient based on a coded value of a quantized weighting coefficient and a first amplitude quantization level table responsive to that a parsed bit is a second value, and determine an amplitude of the corresponding non-quantization weighting coefficient is zero responsive to that the parsed bit is a first value.

That is, bits are successively extracted from the sequence, and it is determined whether the extracted bit is the first value or the second value.

Responsive to that the present parsed bit is the second value, it indicates that A+B bits following the bit are a coded value and a corresponding phase value of the non-zero amplitude, respectively. For example, when the bit is 1, the A+B bits following the bit indicate the amplitude and phase messages of the position (in the order of from row to column). A and B are both integers and A and B are not necessarily the same.

Responsive to that the present parsed bit is the first value, it indicates that the amplitude of the non-quantized weighting coefficient corresponding to the bit is zero. For example, when the bit is zero, it indicates that zero is added at the position.

The above processing is cyclically performed until all the coded values in the sequence are parsed. For example, when 2L*M elements are included, all of them need to be decoded.

It is also to be noted that the above parsing method for the coded value of the non-zero amplitude may be determined based on the first amplitude quantization level table. The first amplitude quantization level table is the same as that in the first embodiment and will not be described again.

In addition, the relationship between the sequence of the weighting coefficients and the positions of the non-quantized weighting coefficients may follow the order of from left to right or from top to bottom. For example, the first passed non-quantized weighting coefficients is the first amplitude value of the first row and the second non-quantized weighting coefficients is the second amplitude value of the first row.

Second Processing Scenario

The second processing unit 52 is configured to acquire a sequence including quantized weighting coefficients for codebook calculation based on a CSI message length.

The second processing unit 52 is configured to successively extract at least one bit from the sequence until the extracted at least one bit has a target coded value matched with a preset second amplitude quantization level table.

The second processing unit 52 is also configured to determine a corresponding non-quantized weighting coefficient based on the target coded value.

The second amplitude quantization level table satisfies immediate decodability.

The difference of the second processing scenario from the first processing scenario is that a different quantization level table is used in the present scenario, and the quantization level tables used in the present scenario satisfy immediate decodability. That is, in the second amplitude quantization level table, different quantization levels correspond to different coded values and any element in any codeword set is not a prefix of another element.

Specifically, the corresponding quantization sequence may be decoded through the reported CSI message length.

Each bit is read in a buffer until the read bit sequence is a coded value in the second amplitude quantization level table; and the amplitude value corresponding to the coded value is determined based on the second amplitude quantization level table.

After the amplitude (and phase value) is decoded, the buffer is flushed and the above processing continues until all the contents in the sequence are parsed out.

In addition, the relationship between the sequence of the weighting coefficients and the positions of the non-quantized weighting coefficients may follow the order of from left to right or from top to bottom. For example, the first parsed non-quantized weighting coefficient is the first amplitude value of the first row and the second non-quantized weighting coefficient is the second amplitude value of the first row.

Third Processing Scenario

The present processing scenario is different from the first two processing scenarios. In the present scenario, processing is not performed on a zero amplitude but only on a non-zero element, that is, processing is performed on a non-zero amplitude.

The second processing unit 52 is configured to parse a position corresponding to K coded values and acquire K coded values corresponding to each position.

The second processing unit 52 is also configured to determine non-quantized weighting coefficients and corresponding positions of the non-quantized weighting coefficients based on the K coded values and a third amplitude quantization level table.

The third amplitude quantization level table in the present scenario may be consistent with the first amplitude quantization level table provided in the first scenario, or may be consistent with the second amplitude quantization level table provided in the second scenario, or may also be another type of a table, which is not exhaustive in the present embodiment.

For example, the network device receives K value and positions of K elements, and determines the amplitude value of the non-quantized weighting coefficients corresponding to each coded value based on a preset quantization level table.

The positions of the K elements (i.e., the quantized weighting coefficients) may be in a one-to-one correspondence with the coded values. That is, the first parsed position indicates the position of the acquired first coded value. Further, the amplitude value corresponding to the coded value is determined based on the third amplitude quantization level table, and the amplitude value is added to the corresponding position.

Finally, it is to be noted that the network device may obtain the downlink channel information through $W = W_1 \hat{W}_2 W_f^H$ calculation. The specific calculation method is not described in detail in the present embodiment.

With the above solutions, quantization processing can be performed on the weighting coefficients required for codebook calculation, so as to reduce a length of the reported message when the relevant parameters of codebook calculation are reported and obtain a compromise in performance overhead.

Figure 12:
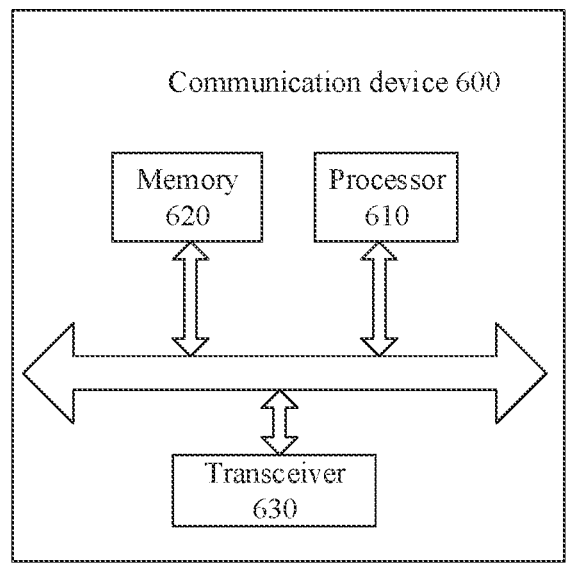
FIG. 12 is a schematic structural diagram of a communication device according to an embodiment of the present disclosure.

FIG. 12 is a schematic structural diagram of a communication device 600 provided by the embodiments of the present disclosure. The communication device may be the terminal device or the network device described in the above embodiments. The communication device 60M illustrated in FIG. 6 includes a processor 610. The processor 610 may call a computer program from a memory and run the computer program to implement the method in the embodiments of the present disclosure.

In one example, as illustrated in FIG. 12, the communication device 600 may also include a memory 620. The processor 610 may call a computer program from the memory 620 and run the computer program to implement the method in the embodiments of the present disclosure.

The memory 620 may be a separate device from the processor 610, or may be integrated into the processor 610.

In one example, as illustrated in FIG. 12, the communication device 600 may also include a transceiver 630. The processor 610 may control the transceiver 630 to communicate with another device, specifically, to transmit information or data to another device, or receive information or data from another device.

The transceiver 630 may include a transmitter and a receiver. The transceiver 630 may further include one or more antennas.

In one example, the communication device 600 may be specifically the network device in the embodiments of the present disclosure. The communication device 600 may implement a corresponding process implemented by the network device in each method of the embodiments of the present disclosure, which will not be elaborated herein for brief description.

In one example, the communication device 600 may specifically be the terminal device or the network device in the embodiments of the present disclosure. The communication device 600 may implement a corresponding process implemented by the mobile terminal/terminal device in each method of the embodiments of the disclosure, which will not be elaborated herein for brief description.

Figure 13:
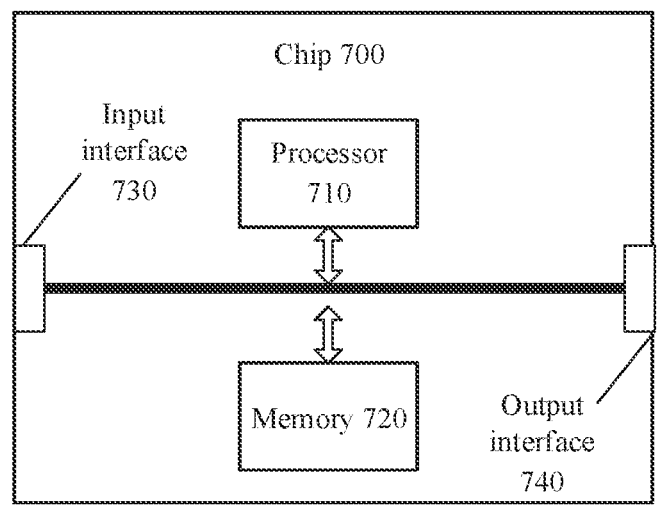
FIG. 13 is a schematic block diagram of a chip according to an embodiment of the present disclosure.

FIG. 13 is a schematic structural diagram of a chip according to the embodiments of the present disclosure. The chip 700 illustrated in FIG. 13 includes a processor 710. The processor 710 can call a computer program from a memory and run the computer program to implement the method in the embodiments of the present disclosure.

In one example, as illustrated in FIG. 13, the chip 700 may also include a memory 720. The processor 710 may call a computer program from the memory 720 and run the computer program to implement the method in the embodiments of the present disclosure.

The memory 720 may be a separate device from the processor 710, or may be integrated in the processor 710.

In one example, the chip 700 may also include an input interface 730. The processor 710 may control the input interface 730 to communicate with another device or chip, and specifically, may acquire information or data transmitted by another device or chip.

In one example, the chip 700 may also include an output interface 740. The processor 710 may control the output interface 740 to communicate with another device or chip, and specifically, may output information or data to another device or chip.

In one example, the chip may be applied to the network device in the embodiments of the present disclosure. The chip may implement a corresponding process implemented by the network device in each method of the embodiments of the disclosure, which will not be elaborated herein for brief description.

In one example, the chip may be applied to the terminal device in the embodiments of the present disclosure. The chip may implement a corresponding process implemented by the terminal device in each method of the embodiments of the disclosure, which will not be elaborated herein for brief description.

It is to be understood that in the embodiments of the disclosure, the chip may also be referred to as a system level chip, a system chip, a chip system or a system-on-chip.

Figure 14:
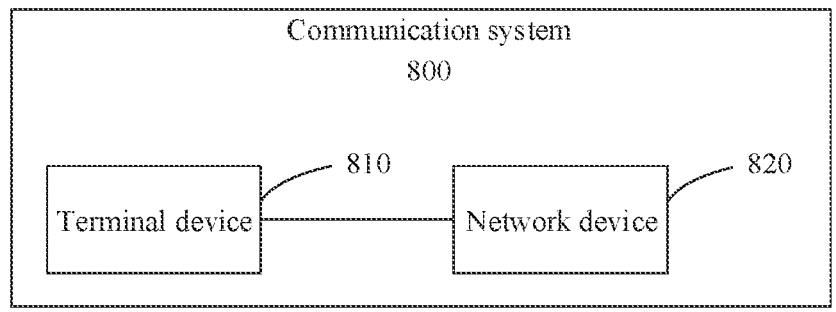
FIG. 14 is a second schematic diagram of a communication system architecture according to an embodiment of the present disclosure.

FIG. 14 is a schematic block diagram of a communication system 800 provided by the embodiments of the present disclosure. As illustrated in FIG. 14, the communication system 800 includes a terminal device 810 and a network device 820.

The terminal device 810 may implement the corresponding functions implemented by the terminal device in the above methods, and the network device 820 may implement the corresponding functions implemented by the network device in the above methods. Details will not be elaborated herein for brief description.

Figure 15:
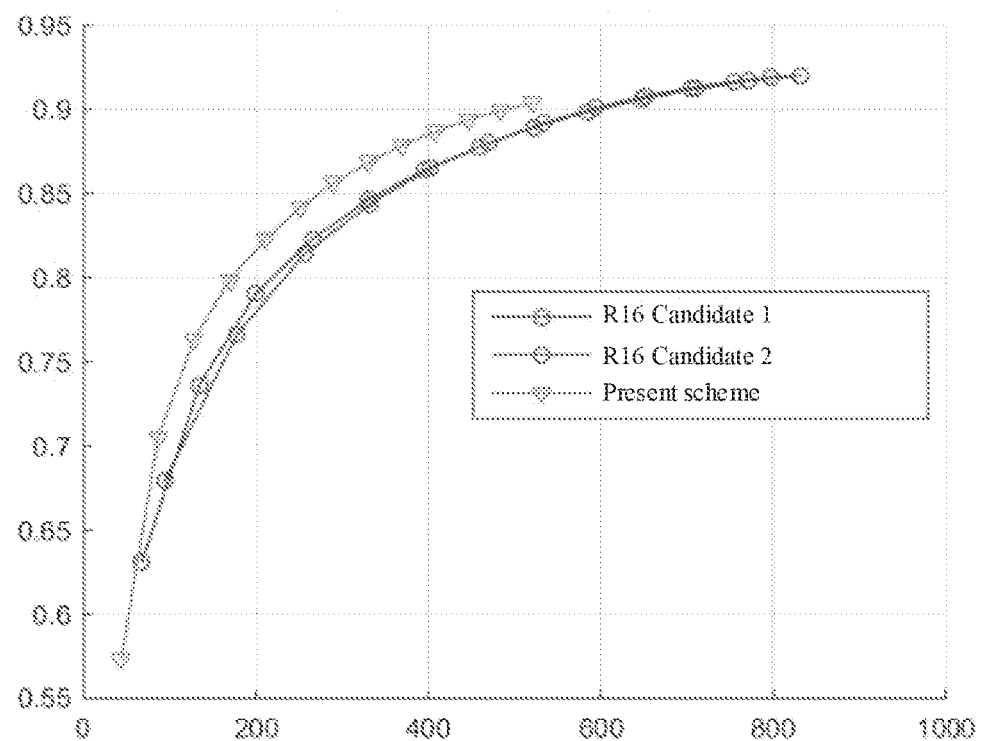
FIG. 15 is a schematic diagram of effect contrast.

FIG. 15 illustrates the effect obtained through the scheme provided by the above embodiments. The horizontal axis represents the number of bits and the vertical axis represents the saved power, in which the triangular connection line represents the scheme provided by the present embodiment. It can be seen that the scheme provided by the present embodiment enables to use less bits and save more power.

It is to be understood that in the embodiments of the disclosure, the processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any related processor and the like. The operations of the methods disclosed in combination with the embodiments of the disclosure may be directly embodied to be executed and completed by a hardware decoding processor, or executed and completed by a combination of hardware and software modules in the decoding processor. The software module may be located in a mature storage medium in the art, such as a Random Access Memory (RAM), a flash memory, a Read-Only Memory (ROM), a Programmable ROM (PROM), an Electrically Erasable PROM (EEPROM) or a register. The storage medium is located in the memory. The processor reads information in the memory, and completes the operations of the above methods in combination with hardware of the processor.

It may be understood that the memory in the embodiment of the disclosure may be a volatile memory or a non-volatile memory, or may include the volatile memory and the non-volatile memory. The non-volatile memory may be an ROM, a PROM, an Erasable PROM (EPROM), an EEPROM or a flash memory. The volatile memory may be an RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of the system and the method described in the disclosure is intended to include but not limited to memories of these and any other suitable type.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include but not limited to memories of these and any other suitable type.

The embodiments of the disclosure also provide a computer-readable storage medium for storing one or more computer programs.

In one embodiment, the computer-readable storage medium may be applied in the network device of the embodiments of the disclosure. The computer programs may enable a computer to perform the corresponding process implemented by the network device in each method of the embodiments of the disclosure, which will not be elaborated herein for brief description.

In one example, the computer-readable storage medium may be applied in the terminal device of the embodiments of the disclosure. The computer programs may enable a computer to perform the corresponding process implemented by the mobile terminal/terminal device in each method of the embodiments of the disclosure, which will not be elaborated herein for brief description.

The embodiments of the disclosure also provide a computer program product. The computer program product includes one or more computer program instructions.

In one embodiment, the computer program product may be applied in the network device of the embodiments of the disclosure. The computer program instructions may enable a computer to perform the corresponding process implemented by the network device in each method of the embodiments of the disclosure, which will not be elaborated herein for brief description.

In one example, the computer program product may be applied in the mobile terminal/terminal device of the embodiments of the disclosure. The computer program instructions may enable a computer to perform the corresponding process implemented by the mobile terminal/terminal device in each method of the embodiments of the disclosure, which will not be elaborated herein for brief description.

The embodiments of the disclosure also provide a computer program.

In one embodiment, the computer program may be applied in the network device of the embodiments of the disclosure. The computer program, when executed by a computer, enables the computer to perform the corresponding process implemented by the network device in each method of the embodiments of the disclosure, which will not be elaborated herein for brief description.

In one example, the computer program may be applied in the mobile terminal/terminal device of the embodiments of the disclosure. The computer program, when executed by a computer, enables the computer to perform the corresponding process implemented by the mobile terminal/terminal device in each method of the embodiments of the disclosure, which will not be elaborated herein for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for codebook processing, applied to a network device, the method comprising:
   receiving, through channel state information (CSI), information comprising first weighting coefficients for codebook calculation acquired by processing second weighting coefficients from a terminal device, wherein the second weighting coefficients are determined based on a first number and a second number, a value of L representing the first number is half of a number of spatial beams, a value of M representing the second number is a number of discrete fourier transform (DFT) basis vectors, L and M are both integers, and the second weighting coefficients comprise amplitude coefficients; and
   determining a corresponding codebook based on information comprising the first weighting coefficients, and determining downlink channel information of the terminal device based on the determined codebook.

2. The method of claim 1, wherein after receiving the information comprising the first weighting coefficients for codebook calculation from the terminal device, the method further comprises:
   successively parsing bits of a sequence comprising the first weighting coefficients for codebook calculation;
   responsive to that a parsed bit is a second value, determining a second weighting coefficient corresponding to the parsed bit based on a coded value of one of the first weighting coefficients and a first amplitude quantization level table; and
   responsive to that the parsed bit is a first value, determining an amplitude coefficient of the second weighting coefficient corresponding to the parsed bit is zero.

3. The method of claim 1, wherein after receiving the information comprising the first weighting coefficients for codebook calculation from the terminal device, the method further comprises:
   acquiring a sequence comprising first weighting coefficients for codebook calculation based on a CSI message length;
   successively extracting at least one bit from the sequence until the extracted at least one bit has a target coded value matched with a preset second amplitude quantization level table; and
   determining a corresponding second weighting coefficient of the second weighting coefficients based on the target coded value.

4. The method of claim 1, wherein after receiving the information comprising the first weighting coefficients for codebook calculation from the terminal device, the method further comprises:
   parsing a position corresponding to K coded values, and acquiring K coded values corresponding to each position; and
   determining second weighting coefficients and corresponding positions of the second weighting coefficients based on the K coded values and a third amplitude quantization level table.

5. A network device, comprising:
   a transceiver, configured to receive information comprising first weighting coefficients for codebook calculation acquired by processing second weighting coefficients from a terminal device through channel state information (CSI), wherein the second weighting coefficients are determined based on a first number and a second number, a value of L representing the first number is half of a number of spatial beams, a value of M representing the second number is a number of discrete fourier transform (DFT) basis vectors, L and M are both integers, and the second weighting coefficients comprise amplitude coefficients; and
   a processor, configured to determine a corresponding codebook based on information comprising the first weighting coefficients, and determine downlink channel information of the terminal device based on the determined codebook.

6. The network device of claim 5, wherein the processor is configured to successively parse bits of a sequence comprising the first weighting coefficients for codebook calculation, determine, responsive to that a parsed bit is a second value, a second weighting coefficient corresponding to the parsed bit based on a coded value of one of the first weighting coefficients and a first amplitude quantization level table, and determine, responsive to that the parsed bit is a first value, an amplitude coefficient of the second weighting coefficient corresponding to the parsed bit is zero.

7. The network device of claim 5, wherein the processor is configured to acquire a sequence comprising first weighting coefficients for codebook calculation based on a CSI message length, successively extract at least one bit from the sequence until the extracted at least one bit has a target coded value matched with a preset second amplitude quantization level table, and determine a corresponding second weighting coefficient of the second weighting coefficients based on the target coded value.

8. The network device of claim 5, wherein the processor is configured to parse a position corresponding to K coded values, acquire K coded values corresponding to each position, and determine second weighting coefficients and corresponding positions of the second weighting coefficients based on the K coded values and a third amplitude quantization level table.

9. A non-transitory computer readable storage medium for storing a computer program that causes a computer of a network device to execute a method for codebook processing, comprising:
  receiving, through channel state information (CSI), information comprising first weighting coefficients for codebook calculation acquired by processing weighting coefficients from a terminal device, wherein the second weighting coefficients are determined based on a first number and a second number, a value of L representing the first number is half of a number of spatial beams, a value of M representing the second number is a number of discrete fourier transform (DFT) basis vectors, L and M are both integers, and the second weighting coefficients comprise amplitude coefficients; and
  determining a corresponding codebook based on information comprising the first weighting coefficients, and determining downlink channel information of the terminal device based on the determined codebook.

* * * * *